Patented Apr. 25, 1939

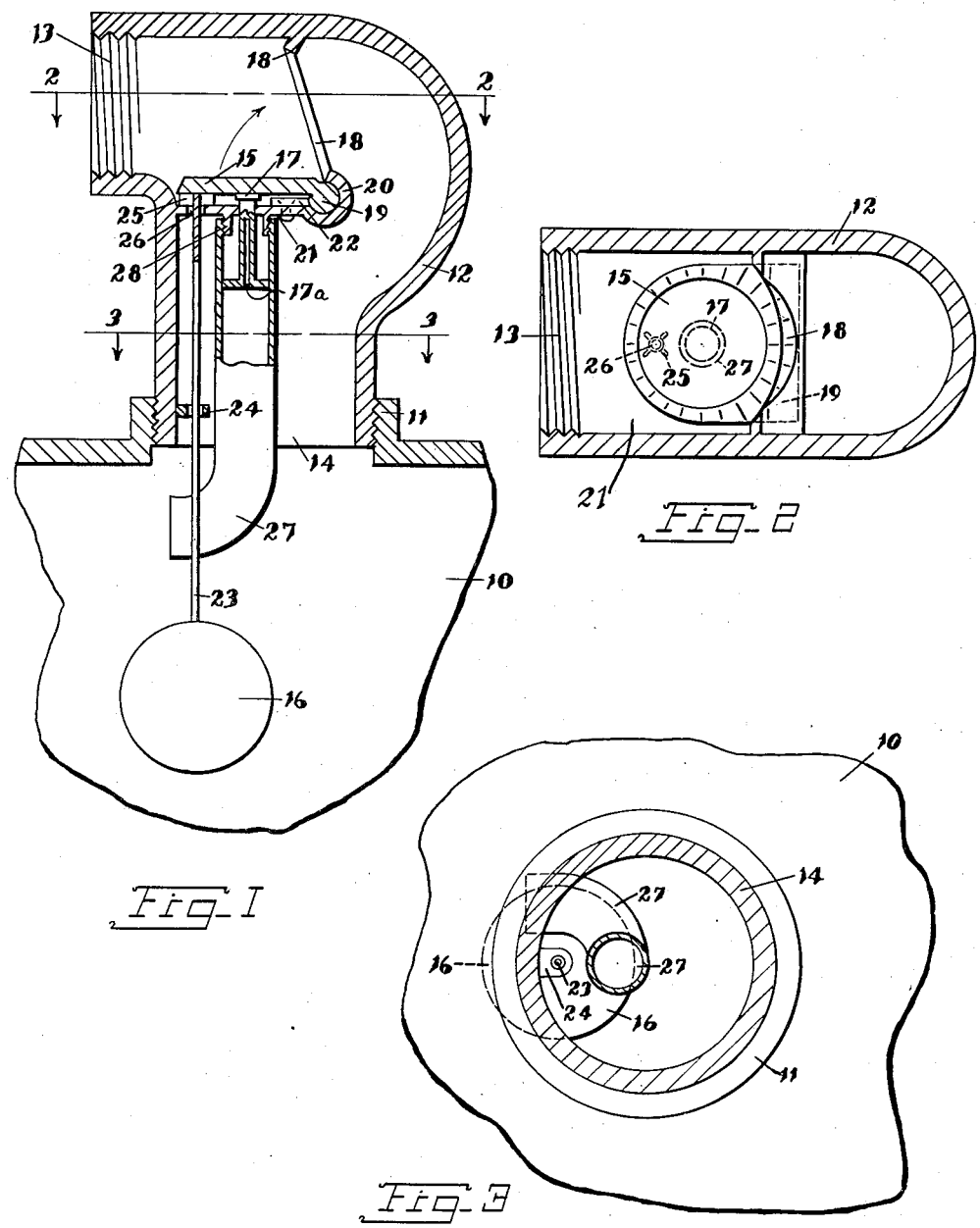

2,155,400

UNITED STATES PATENT OFFICE 2,155,400

COMBINATION OVERFLOW AND PRESSURE VALVE

Nemo V. Caminiti, Springfield, Long Island, N. Y.

Application December 24, 1936, Serial No. 117,487
Renewed July 28, 1938

7 Claims. (Cl. 137—68)

This invention relates to new and useful improvements in a combination overflow and pressure valve.

More specifically, the invention contemplates the provision of a valve which is adapted to automatically shut off the supply of fluid, such as fuel oil, when a tank or receptacle to which the fluid is supplied becomes filled to a pre-determined level, or the internal pressure rises above a pre-determined amount.

The invention is particularly valuable in domestic oil burner systems in which closed tanks are used to store fuel oil. It is customary to provide these closed tanks with a vent pipe which extends upwards from seven to nine feet above the tank and which usually terminates adjacent an outside wall of a building. The vent is necessary to permit the escape of air while the fuel tank is being filled. Numerous accidents occur during the filling of such fuel tanks and a paramount purpose of this invention is to eliminate the possibility of such accidents.

One type of accident referred to consists in over-filling the fuel tank so that instead of merely air from the interior of the fuel tank passing through the vent opening, fuel oil passes. This mishap is quite serious for several reasons. In the first place, if the vent discharges to the outside wall of the building the overflow fuel oil will discolor and ruin the appearance of the wall. If the vent does not discharge outside of the building damage will still be caused in that the overflow will present a serious fire hazard, besides presenting an unsightly appearance. Once the tank is filled to such an extent that an overflow through the vent takes place, the mere turning off of the fuel supply will not stop the overflow since there is then an internal pressure within the tank and the overflow will continue for sometime after the fuel supply has been cut. It will cease when the pressure within the tank has fallen to atmospheric pressure.

Another of the hazards referred to resides in damage to the fuel storage tank due to excessive pressures. These excessive pressures may be caused by the vent becoming blocked. After an overflow the possibility of the vent becoming blocked is quite great because vents are of small diameter and are not designed to accommodate the passage of the overflow. The hardening of some of the fuel oil within the vent is sufficient to block it. Once the vent becomes blocked and fuel oil is supplied to the tank the internal pressure of the tank will rise. This internal pressure will either completely disrupt the tank or bend and weaken members of the tank to an extent which makes the tank dangerous and/or reduces its life.

This invention contemplates the provision of a combination overflow and pressure valve which acts to automatically cut off the supply of fuel oil to a tank when a certain pre-determined level of the fuel oil within the tank is reached, or when a certain pre-determined pressure is reached.

The invention contemplates so constructing the valve that the pressure operating portion may close the valve prior to or simultaneous with the closing action by the level control device.

It is a further object of this invention to so construct the combination valve that it is provided with merely one valve element which is capable of closing to shut off the supply of fuel to the tank, operable either by the fuel level control device or the pressure sensitive device.

Another object of this invention resides in so arranging the valve that it has a tendency to normally seek an open position, except when it is partially lifted while fluid is passing through the valve. Then the valve element has a tendency of being automatically shut by the passing fuel and maintained in the shut position by the fuel pressure behind the valve.

Furthermore, it is proposed to utilize a float connected with a stem and capable of slightly lifting the valve when the float is floated by liquid within the tank reaching a pre-determined level.

Still further the invention proposes the provision of a pressure element located beneath the valve and capable of slightly lifting the valve when pressure within the tank is exceeded.

Another object of the invention is the construction of a device as described which is simple and durable and which may be manufactured and sold at a reasonable cost.

For further comprehension of the invention, and of the objects and advantages thereof, reference will be had to the following description and accompanying drawing and to the appended claims in which the various novel features of the invention are more particularly set forth.

In the accompanying drawing forming a material part of this disclosure:

Fig. 1 is a transverse vertical sectional view of a combination overflow and pressure valve constructed according to this invention.

Fig. 2 is a horizontal sectional view taken on the line 2—2 of Fig. 1.

Fig. 3 is a horizontal sectional view taken on the line 3—3 of Fig. 1.

The valve, according to this invention, is used in combination with a closed tank 10. This tank is provided with a neck portion 11. A valve body 12 has an inlet portion 13 and an outlet portion 14. The outlet portion 14 is provided with a threaded section which may be threadedly engaged into the neck 11 to mount the valve on the tank. The inlet portion 13 is also threaded and is adapted to be connected with a fuel supply pipe. The valve body 12 is capable of conveying fuel or liquid from the inlet 13 to discharge from the outlet 14 and thus into the tank 10.

A valve element 15 is provided for closing the passage through the valve body and is arranged to normally maintain an open position. A float 16 is associated with mechanism for closing the valve 15 when the liquid in the tank rises above a pre-determined amount. A pressure sensitive device including a pressure control element 17 is provided for closing the valve element 15 when the pressure in the tank rises above a pre-determined amount, operable either prior to or simultaneous with the float closing device.

The valve body 12 is provided with an internal seat 18 arranged substantially in the vertical direction but leaning slightly forwards towards the valve element 15 in the open position of the valve. Thus when the valve 15 engages on the seat 18 it will always have the tendency of falling downwards by gravity to its open position. The valve 15 has a pintle element 19 associated with one side by which it may pivot upwards or downwards. This pintle element 19 is supported by a cylindrical socket portion 20 formed upon a partition portion 21 within the valve body. A retaining strip 22 is riveted or in any other manner secured to the partition 21 and acts against the cylindrical pintle portion 19 for maintaining it within its socket. Of course, the pintle portion 19 is free to turn in the socket which permits the valve to move from the open to the closed position and vice versa.

The float device includes a stem 23 which is mounted on the float 16 and which passes through a bearing 24 mounted on the inner wall of the outlet portion 14 of the valve body. The upper end of the stem 23 is provided with several radial finger portions 25 forming a head which engages the underside of the valve 15. The stem 23 passes through an opening 26 in the partition 21. This opening is of a size which permits liquid or fuel from above the partition 22 to pass through into the tank.

The pressure sensitive device comprises an air tube 27 which extends downwards through the outlet 14 into the top portion of the tank 10. This tube 27 is threadedly engaged on a small boss 28 arranged on the bottom side of the partition 21. The pressure control element 17 is slidable through the partition 21 and has a head portion engaging against the underside of the valve 15. This pressure control element comprises merely a rod or similar element which has a central bore 17a merely for the purpose of reducing its weight.

The operation of the device is as follows:

A supply of liquid or fuel enters through the inlet portion 13, passes through the valve seat opening 18 and then past the edge portion of the partition 21 and down and out through the outlet portion 14 into the fuel supply tank 10. If the vent of the tank is operating satisfactorily the liquid in the tank will rise until the float 16 moves up a sufficient distance to slightly lift the valve 15. Normally, the valve 15 is disposed in a horizontal direction beneath the passage of the liquid through the valve body, but when it is slightly lifted by the float device the passage of the liquid will serve to lift it completely and force it against the seat 18. The valve is now closed and additional liquid cannot be supplied to the tank 10. The valve will remain closed as long as liquid is supplied to the inlet 13. Once the supply is cut off the residue above the partition 21 will pass through the opening 26 into the tank 10 and then the valve 15 will automatically fall open.

In the event that the vent of the tank is blocked and the pressure within the tank rises, the valve 15 will automatically close prior to the time that the tank 10 is completely filled. The reason for this is that as the pressure within the tank rises the pressure control element 17 will move upwards and slightly lift the valve 15. The liquid passing through the valve body will force the valve closed upon its seat.

It is thus impossible to fill the tank unless the vent is functioning. Furthermore, it is impossible to damage the tank due to the building up of excess pressures by forcing the liquid into the tank while the vent is closed. A feature of the invention resides in the fact that the pressure control element 17 and the float control element 25 are not directly connected with the valve 15 but merely contact the valve and are capable of slightly lifting the valve when it is required. Therefore the valve is free to be automatically closed by the passage of the liquid through the valve body.

While I have illustrated and described my invention with some degree of particularity, I realize that in practice various alterations therein may be made. I therefore reserve the right and privilege of changing the form of the details of construction or otherwise altering the arrangement of the correlated parts without departing from the spirit or the scope of the appended claims.

Having thus described my invention, what I claim as new and desire to secure by United States Letters Patent is:

1. A device of the class described, comprising a valve body for guiding the passage of fuel into a tank and having a recessed horizontal portion and a substantially vertical valve seat portion, a valve element hingedly mounted at one side and normally disposed horizontally on said horizontal portion and adapted to be closed by being raised by the passage of fuel through said valve body when slightly lifted from its horizontal position, and a float device to slightly lift said valve when the liquid in said tank reaches a pre-determined level.

2. A device of the class described, comprising a valve body for guiding the passage of fuel into a tank and having a recessed horizontal portion and a substantially vertical valve seat portion, a valve element hingedly mounted at one side and normally disposed horizontally on said horizontal portion and adapted to be closed by being raised by the passage of fuel through said valve body when slightly lifted from its horizontal position, and a float device to slightly lift said valve when the liquid in said tank reaches a pre-determined level, said valve seat portion being inclined slightly from the vertical towards the valve element so that the valve element has a natural tendency of moving downwards due to gravity and so opening.

3. A device of the class described, comprising a valve body for guiding the passage of fuel into a tank and having a recessed horizontal portion and a substantially vertical valve seat portion, a valve element hingedly mounted at one side and normally disposed horizontally on said horizontal portion and adapted to be closed by being raised by the passage of fuel through said valve body when slightly lifted from its horizontal position, and a float device to slightly lift said valve when the liquid in said tank reaches a pre-determined level, comprising a float, a stem connected with said float, a headed end portion on the stem engaging beneath and against the valve element to partially lift the valve element without interfering with further motion of the valve element to its closed position.

4. In a device of the class described, a valve body for guiding the passage of fuel into a tank and having a recessed horizontal portion and a substantially vertical valve seat portion, a valve element hingedly mounted at one side and normally disposed horizontally on said horizontal portion and adapted to be closed by being raised by the passage of fluid through said valve body when slightly lifted from said horizontal position, and a pressure controlled element adapted to slightly lift said valve element when the pressure within said tank reaches a pre-determined amount.

5. In a device of the class described, a valve body for guiding the passage of fuel into a tank and having a recessed horizontal portion and a substantially vertical valve seat portion, a valve element hingedly mounted at one side and normally disposed horizontally on said horizontal portion and adapted to be closed by being raised by the passage of fluid through said valve body when slightly lifted from said horizontal position, and a pressure controlled element adapted to slightly lift said valve element when the pressure within said tank reaches a pre-determined amount, said pressure controlled element being slidably mounted within a tube extending into the top of the tank, and said pressure controlled element having a head portion engaging against the underside of the valve element to lift the valve when moved upwards.

6. In a device of the class described, a valve body for guiding the passage of fuel into a tank and having a horizontal portion with a substantially vertical valve seat, a valve element hingedly mounted at one side and normally disposed horizontally in said horizontal portion and adapted to be closed by the passage of fluid through said valve body when slightly lifted from said horizontal position, and a pressure controlled element adapted to slightly lift said valve element when the pressure within said tank reaches a pre-determined amount, said valve being provided with a substantially horizontal partition located beneath said valve element, said valve element having a pintle portion by which it is pivotally mounted to the edge of said partition, and said pressure controlled element being mounted through said partition to engage against the underside of the valve element and to be operative by pressure beneath the partition.

7. A device of the class described, comprising a valve body for guiding the passage of fuel into a tank and having a recessed horizontal portion and a substantially vertical valve seat portion, a valve element hingedly mounted at one side and normally disposed horizontally on said horizontal portion and adapted to be closed by being raised by the passage of fuel through said valve body when slightly lifted from its horizontal position, a float device to slightly lift said valve when the liquid in said tank reaches a predetermined level, and a pressure controlled element adapted to slightly lift said valve element when the pressure within the said tank reaches a predetermined amount.

NEMO V. CAMINITI.